(12) United States Patent
Engström et al.

(10) Patent No.: US 8,539,639 B2
(45) Date of Patent: Sep. 24, 2013

(54) DUSTCUP

(75) Inventors: Christer Engström, Åkersberga (SE); Torkel Ingre, Stockholm (SE)

(73) Assignee: AB Electrolux, Stockholm (SE)

( * ) Notice: Subject to any disclaimer, the term of this patent is extended or adjusted under 35 U.S.C. 154(b) by 123 days.

(21) Appl. No.: 13/124,254

(22) PCT Filed: Oct. 5, 2009

(86) PCT No.: PCT/SE2009/000435
§ 371 (c)(1),
(2), (4) Date: Sep. 12, 2011

(87) PCT Pub. No.: WO2010/042002
PCT Pub. Date: Apr. 15, 2010

(65) Prior Publication Data
US 2011/0308036 A1 Dec. 22, 2011

Related U.S. Application Data

(60) Provisional application No. 61/106,072, filed on Oct. 16, 2008.

(30) Foreign Application Priority Data

Oct. 10, 2008 (SE) ........................................ 0802181

(51) Int. Cl.
*A47L 9/10* (2006.01)
(52) U.S. Cl.
USPC .................................. 15/344; 15/347; 15/352

(58) Field of Classification Search
USPC ...................... 15/344, 329, 347, 352; 55/429, 55/428, 487, 488, 497, DIG. 3
See application file for complete search history.

(56) References Cited

U.S. PATENT DOCUMENTS

| 4,967,443 | A | * | 11/1990 | Krasznai et al. | ................. | 15/347 |
| 5,020,187 | A | * | 6/1991 | Kosten et al. | ................... | 15/347 |
| 7,799,103 | B2 | * | 9/2010 | Coburn | ......................... | 55/304 |
| RE43,603 | E | * | 8/2012 | Coburn et al. | ................... | 15/344 |

FOREIGN PATENT DOCUMENTS

| EP | 1 523 916 | 4/2005 |
| EP | 1 977 672 | 10/2008 |

* cited by examiner

*Primary Examiner* — Dung Van Nguyen
(74) *Attorney, Agent, or Firm* — Hunton & Williams LLP

(57) ABSTRACT

It is presented a dust cup housing (11) comprising a filter assembly which comprises an outer filter (25) and an inner filter (24). The outer filter and inner filter are formed as receptacles and the inner filter is slidably insertable into the outer filter. In a mounted position the inner filter is arranged to be substantially fully inserted into the outer filter. The filter assembly further comprises a fixing member (40, 41; 50, 51; 60, 61) which is arranged to retain the inner filter in a predetermined displacement (d) position relative to the mounted position, in response to the inner filter being subjected to an extraction force for detaching the filter assembly from the dust cup housing. Thereby a user of the filter is in a convenient and intuitive way alerted that the filter assembly comprises more than one filter.

11 Claims, 4 Drawing Sheets

DUSTCUP

TECHNICAL FIELD

The present invention generally relates to dust cups, and more particularly to a dust cup with a filter assembly comprising an inner filter which is slidably insertable into an outer filter. It also relates to a vacuum cleaner comprising such a dust cup.

DESCRIPTION OF RELATED ART

Bagless dust cups are convenient for use in household appliances like vacuum cleaners. The bagless solution is often less expensive in the long run, as compared to dust cup arrangements having throwaway dust bags. Furthermore, it is convenient for the user since the bagless dust cups never run out of throwaway dust bags, and the user is never confronted with the problem in the convenient store of having to look for, and choose from, an abundance of varieties of dust bags which are available for dust cups in different models of e.g. vacuum cleaners. However, the bagless dust cups provide new challenges for the user. The dust cups need to be regularly emptied, and permanent filters, which are typically arranged within the dust cups, have to be cleansed.

Dust cups with permanent bagless filters, which are arranged in a filter assembly comprising a plurality of filters are known. A filter assembly may comprise a combination of an outer fine meshed (fine dust) filter and an inner wide-meshed filter or the opposite arrangement. The inner filter is slidably insertable into the outer filter, such that the inner filter and the outer filter complement each other and optimize the filtering function of the filter assembly. However, with the double filtering function, a problem arises for the user. During maintenance the user sometimes does not notice the double filter structure. Often, the user does not read the instructions in the maintenance manual, or does not understand that the filter assembly comprises a plurality of filters. Therefore, the user forgets to separate the inner filter from the outer filter, whereby the cleansing of the filter assembly is not properly conducted.

SUMMARY

In view of the above, it would be desirable to achieve a dust cup which at least alleviates the downsides mentioned with prior art.

According to a first aspect of the present invention there has been provided a dust cup comprising a dust cup housing which encompasses a dust cup chamber. The dust cup housing further comprises an air inlet and an air outlet, which air inlet and air outlet define a path for a dust laden air-stream to flow through the dust cup chamber. Further, the air outlet is arranged to be connectable to an air suction element, to which the path is in fluid communication. The dust cup further comprises a filter assembly having a first end, which is removably arranged at the air outlet for filtering the dust-laden air-stream. The filter assembly comprises an outer filter and an inner filter. The outer filter and the inner filter are formed as receptacles which are concentrically and unidirectionally arranged with a respective receptacle opening directed towards the first end of the filter assembly. The inner filter is slidably insertable into the outer filter, and in a mounted position the inner filter is arranged to be substantially fully inserted into the outer filter. The filter assembly further comprises a fixing member which is arranged to retain the inner filter in a predetermined displacement position relative to the mounted position, in response to the inner filter being subjected to an extraction force for detaching the filter assembly from the dust cup housing.

Thus, there is provided a dustcup which has a fixing member that will enable a displacement between the inner filter and the outer filter upon demounting of the filter assembly from the dustcup. When a user of for instance a vacuum cleaner provided with a dustcup according to the present invention detaches the filter assembly to cleanse it, the inner filter will automatically become visible for the user, as the fixing member retains the inner filter in a position which is displaced from the mounted position, in which the inner filter is substantially fully inserted in the outer filter. This will assist the user in remembering to cleanse the inner filter as well as the outer filter.

In accordance with an embodiment of the dustcup, wherein said fixing member is arranged, such that said inner filter, upon being subjected to an extraction force larger than a predetermined threshold force, is detachable from said outer filter. Thus, the inner filter may be fully detached from the outer filter when the user applies a large enough extraction force.

In accordance with an embodiment of the dust cup, the filter assembly is detachable from the housing, upon being subjected to an extracting force being smaller than the predetermined threshold force. This is advantageous, since it is convenient to allow the filter assembly to be detached from the dust cup housing before detaching the inner filter.

In accordance with an embodiment of the dust cup, the fixing member comprises a protruding portion arranged on an outer surface of the receptacle of said inner filter, which protruding portion is further arranged to slide in a receiving portion arranged on an inner surface of the receptacle of said outer filter, which provides a mechanically uncomplicated solution which is easy to integrate in the filter assembly and has a low additional manufacturing cost.

In accordance with an embodiment of the dust cup, the fixing member comprises a protruding portion arranged on an inner surface of the receptacle of said outer filter, which protruding portion is further arranged to slide in a receiving portion arranged on an outer surface of the receptacle of said inner filter, which provides a mechanically uncomplicated solution which is easy to integrate in the filter assembly and has a low additional manufacturing cost.

In accordance with an embodiment of the dust cup, the fixing member comprises friction surfaces arranged on said inner surface of said outer filter and said outer surface of said inner filter, which provides a mechanically uncomplicated solution which is easy to integrate in the filter assembly and has a low additional manufacturing cost.

In accordance with an embodiment of the dust cup, the receiving portion has a length corresponding to said predetermined displacement, which provides a mechanically uncomplicated solution.

In accordance with an embodiment of the dust cup, the inner filter comprises a first grip element. This facilitates the extraction of the filter assembly from the dust cup housing for instance when the user wants to cleanse the filter assembly. Furthermore, by placing the first grip element on the inner filter, the functionality of the present inventive concept is reinforced, since the grip element may focus the user to extract the inner filter first, which will cause the filter assembly to be detached from the dust cup housing, and simultaneously displace of the inner filter into the retained position such that it becomes visible for the user that there are both an inner and an outer filter.

In accordance with an embodiment of the dust cup, the outer filter comprises a second grip element. This further facilitates the demounting of the filter assembly. The user is allowed to grab the first and second grip element and pull the filters apart in a convenient and user friendly way. Further, by providing grip elements the user is more likely to intuitively perform the expected steps of dismounting the filter assembly.

In accordance with an embodiment of the dust cup, the receptacles have one of a cup shape, conical, and a frusto-conical shape, which is advantageous for increasing the filtering surface.

The dust cup can be used in any type of dust separating apparatus, but one preferred kind of apparatus is a vacuum cleaner apparatus.

The different features of the above-mentioned aspects of the invention can be combined in any combination.

The embodiments of the present invention provide for a novel and alternative way of drawing attention to the presence of inner filters in a filter assembly such that the user remembers to cleanse all filters of the dust cup. Furthermore, the present inventive concept solves the problem in a user-friendly and intuitive way. Moreover, it is an advantage with some embodiments of the invention that they allow for facilitated handling of the filter assembly during mounting and dismounting of the inner and outer filters.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

Unless otherwise defined, all terms (including technical and scientific terms) used herein have the same meaning as commonly understood by one of ordinary skill in the art to which embodiments of the present invention belong. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

Embodiments of the present invention will now be described in more detail, reference being made to the enclosed drawings, in which.

DETAILED DESCRIPTION OF EMBODIMENTS

Embodiments of the present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
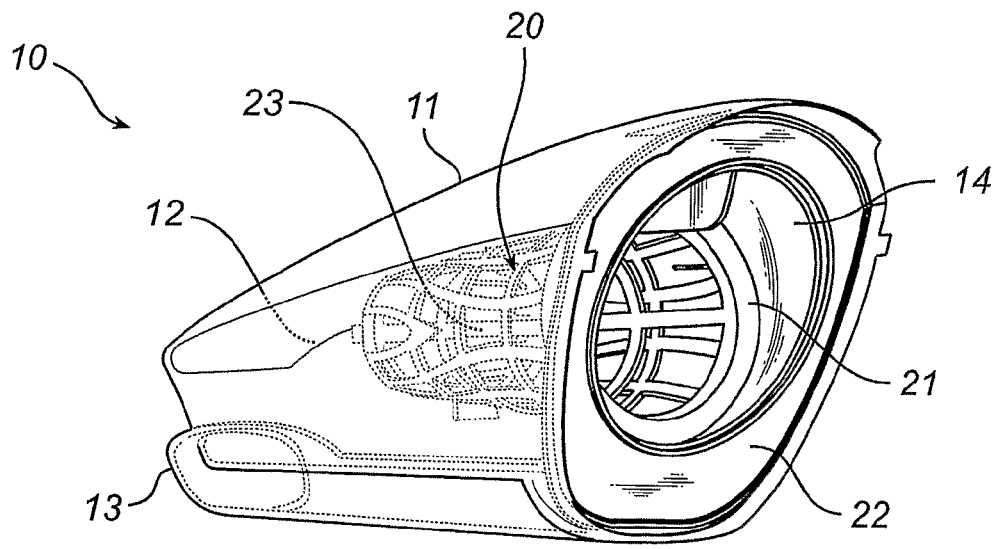
FIGS. 1a) to c) are schematic perspective views illustrating a dust cup according to an embodiment of the present invention in a) a mounted, and b) and c) a dismounted position, respectively.
Figure 3:
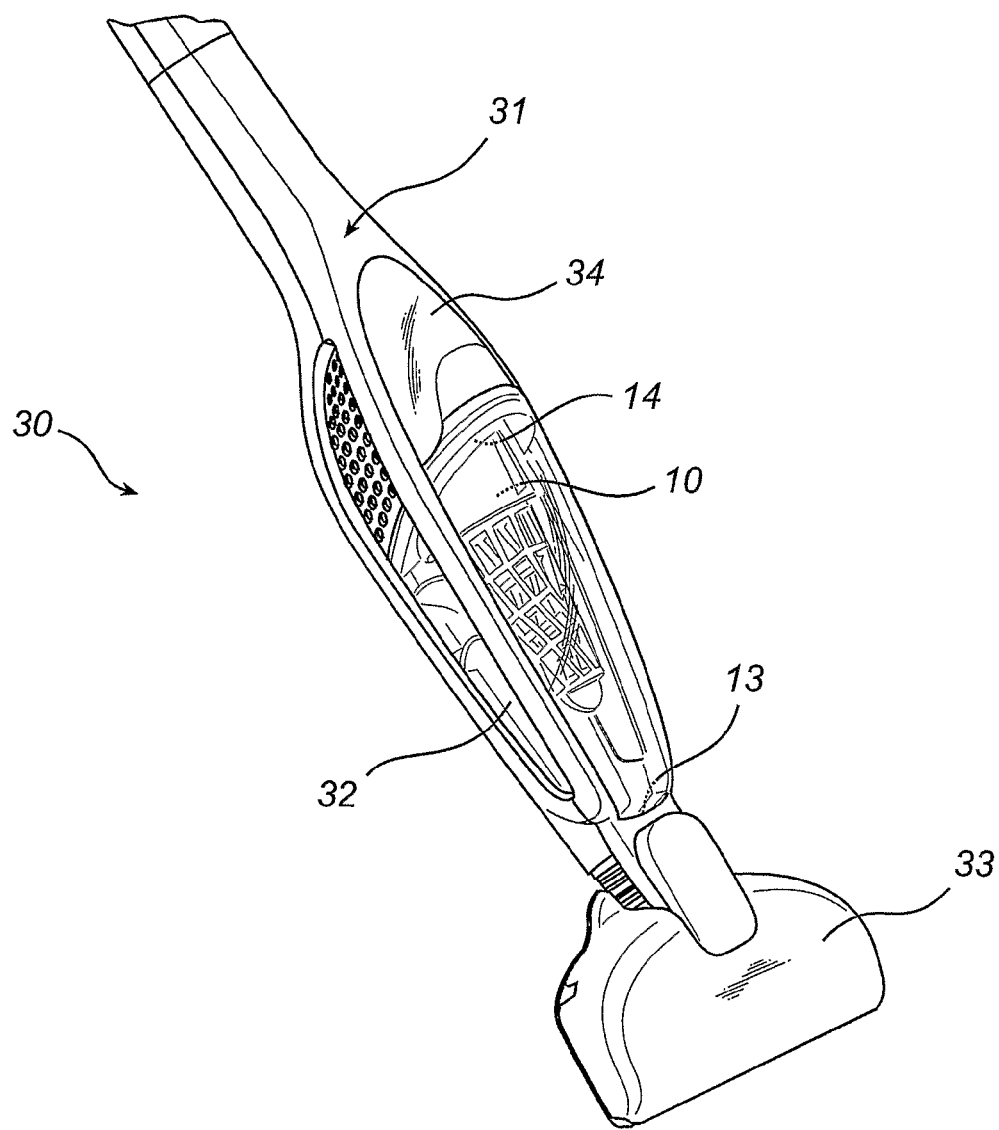
FIG. 3 is a front perspective view of a vacuum cleaner apparatus comprising an embodiment of a dust cup according to the present invention.

FIG. 1a) illustrates an exemplifying embodiment of a dust cup 10 according to the present invention. The dust cup 10 comprises a dust cup housing 11, which encompasses a dust cup chamber 12. The dust cup housing 11 is here basically cylindrical, however different designs and shapes of the dust cup housing 11 are possible. An air outlet 14 is formed by an aperture in the dust cup housing 11, which aperture is arranged in a first end of the dust cup housing 11. Further, an aperture arranged at the opposite end of the dust cup housing 11 forms an air inlet 13. When, the dust cup 10 is utilized in for instance a vacuum cleaner, which is illustrated in FIG. 3, or some other type of device for separating dust and dirt from a dust-laden air-stream, the air outlet 14 is further (directly or indirectly) connected to, and thereby brought to be in fluid communication with, an air suction element (not shown), e.g. the suction motor in the vacuum cleaner. During operation of the vacuum cleaner, the air inlet 13 and the air outlet 14 then forms a path for a dust laden air-stream through the dust cup chamber 12.

Furthermore, a filter assembly 20 is arranged in the path for the dust laden air-stream to filter the dust laden air-stream. A first end 22 of the filter assembly 20 is arranged at the aperture forming the air outlet 14 of the dust cup housing 11, and the body 23 of the filter assembly is arranged to extend inside the dust cup chamber 12. A filter assembly opening 21 is arranged at the first end 22 of the filter assembly 20.

When the vacuum cleaner is in operation, dirt particles that are separated from the dust laden air-stream are partly deposited in the filter assembly 20, and partly collected and retained in the dust cup chamber 12. The dust cup housing 11 is typically a molded plastic part. The plastic material may be transparent, translucent or opaque, or be composed of different subparts of different materials.

Figure 1B:
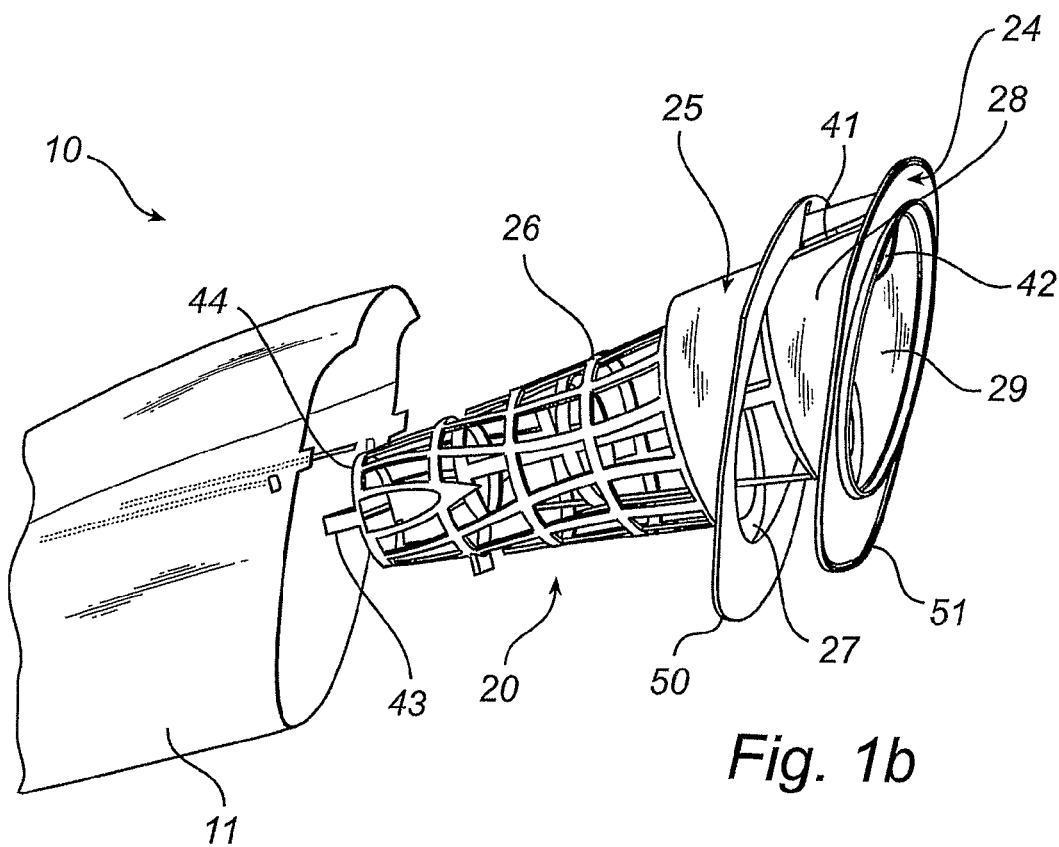

FIG. 1b) illustrates a perspective view of the filter assembly 20 as it is dismounted from the dust cup housing 11. The filter assembly 20 comprises an inner filter 24 and an outer filter 25. The outer filter 25 is formed as a receptacle with a receptacle body 26 and an outer filter opening 27. Here, the receptacle body 26 is substantially cup shaped. In alternative embodiments the receptacle body 26 may be formed in a conical shape, or a frusto-conical shape. As is understood by a man skilled in the art, other shapes of the receptacle body 26 are possible and are considered to fall within the scope of the invention.

The inner filter 24 is formed as a receptacle with a receptacle body 28 and an inner filter opening 29. Typically, the inner filter 24 is arranged to have substantially the same shape as the outer filter 25. However, the dimension of the inner filter 24 is slightly smaller than the outer filter 25. In the mounted position, as is illustrated in FIG. 1a), the inner filter 24 is substantially fully inserted into the outer filter 25. Thus, the filter assembly 20 and the outer filter 25 are concentrically and unidirectionally arranged. The edges 50, 51 of inner filter opening 29 and the outer filter opening 27 bear against each other and the inner filter opening 29 basically forms the opening 21 of the filter assembly 20. The edges 50, 51 of the inner filter opening 29 and the outer filter opening 27 are here arranged as a respective protruding disc like portion with the openings in the centre, herein after for simplicity referred to as a disc, which extends circumferentially from the outer surface of the receptacle and about the respective filter opening. The outer rim of the discs, i.e. the edges 50, 51, are further shaped to fit into the dust cup housing air outlet 14 and to be removably attached to the dust cup housing air out let 14. A tight fit between the discs and the air outlet 14 forces the air-stream to pass through the filter assembly 20 during operation of the vacuum cleaner.

Figure 1C:
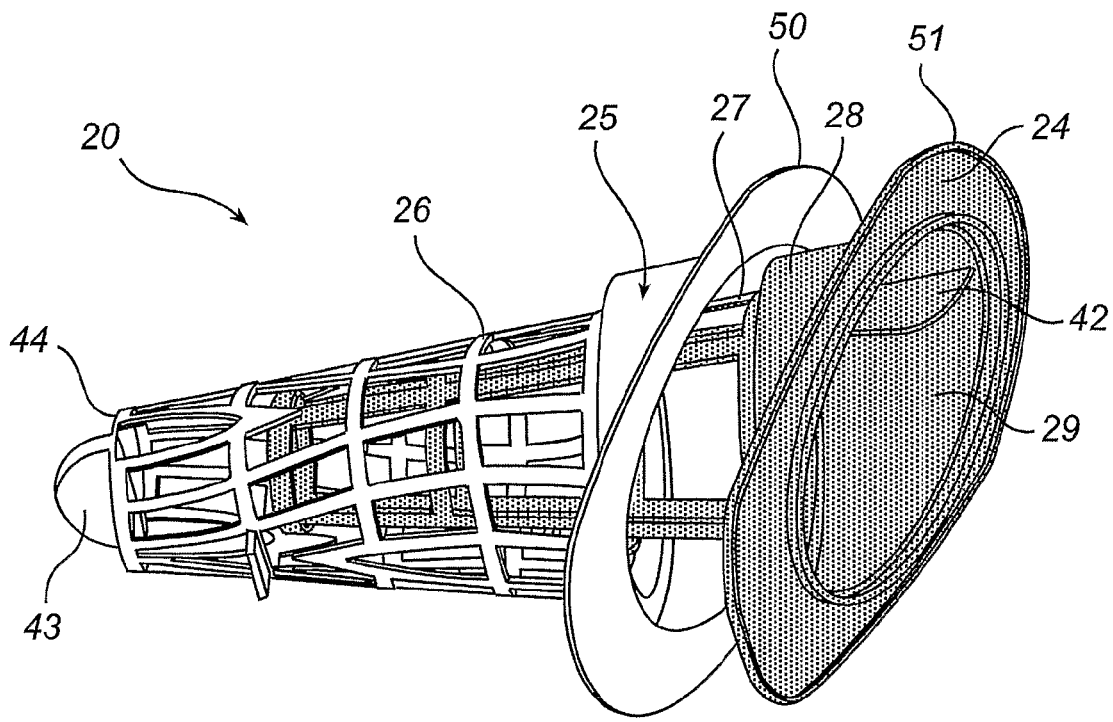

Referring now to FIG. 1*c*) the exemplifying embodiment of the dust cup 10 according to the present invention is further provided with a first grip 42 and a second grip 43 to facilitate the dismounting of the filter assembly 20. The first grip 42 is here a protruding element arranged on the inner surface of the receptacle 28 of the inner filter 24 and at the opening 29 of the inner filter receptacle 28. The first grip 42 may alternatively be provided with suitable gripping surfaces. The gripping surfaces (not shown), may be a second material applied upon the surface of the first grip 42 or be provided by a pattern on the surface of the first grip 42. The gripping surfaces will also help the user to identify the first grip. When the user intends to detach the filter assembly 20 from the dust cup housing 11, the user grabs the first grip 42 and applies an extraction force to extract the filter assembly 20 via the air outlet 14. The inner filter 24 is slidably arranged in the outer filter 25. Furthermore, the filter assembly 20 may be fully detached from the dust cup housing 12, as is explained below.

In an embodiment of the dust cup a second grip 43 is arranged on the outer surface of the outer filter receptacle 26. The second grip 43 is arranged as protruding portion which may alternatively be provided with suitable gripping surfaces. Preferably, the second grip 43 is arranged at a second end 44 of the outer filter 25. Dismounting of the inner filter 24 from the outer filter 25 is facilitated for the user, as the first grip 42 and the second grip 43 may now be grabbed with a respective hand and the inner and outer filters 24, 25 may be detached by pulling the respective filters in opposite directions and thereby applying an extraction force.

Figure 2A:
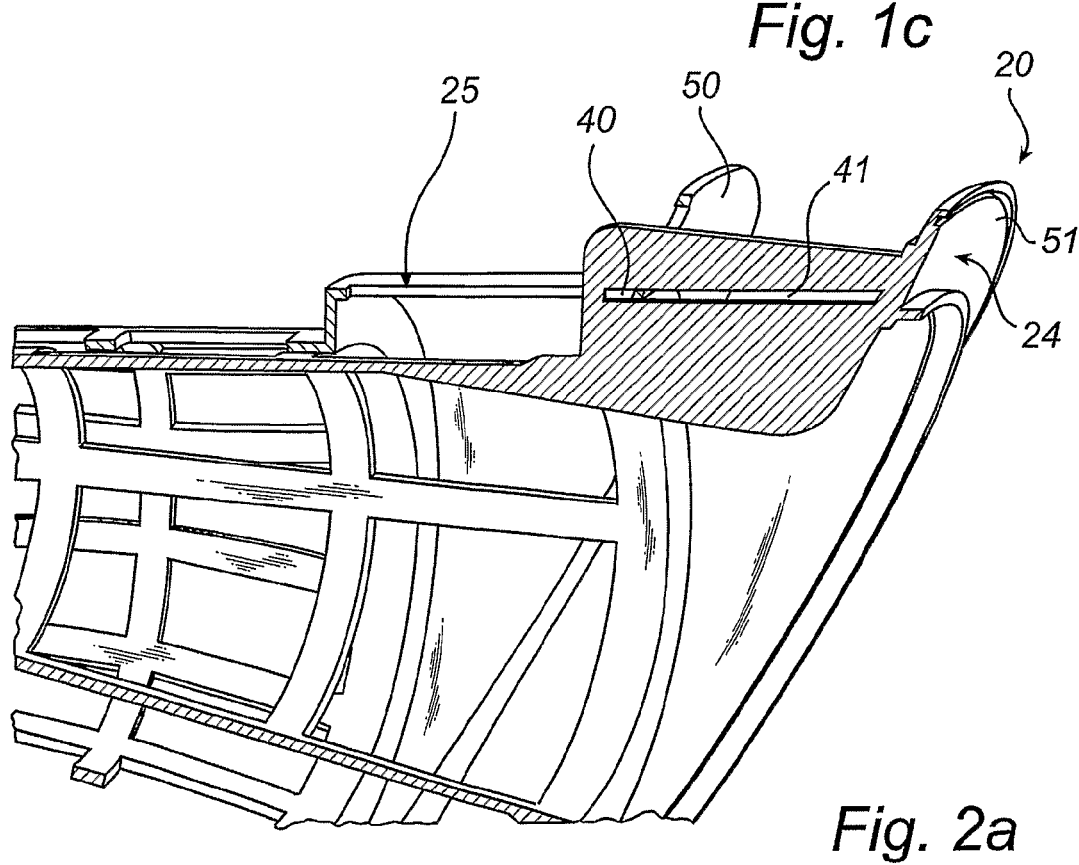
FIGS. 2a) to c) are close-up cross-sectional views illustrating alternative embodiments of the present invention.

FIGS. 2*a*) to *c*) illustrate close-up cross-sectional views of alternative embodiments of a fixing member according to the present invention. In the present invention, the filter assembly 20 comprises a fixing member which is arranged to retain the inner filter 24 in a predetermined displacement position relative to the mounted position, in response to the inner filter 24 being subjected to an extraction force for detaching the filter assembly 20 from the dust cup housing 12. The above mentioned extraction force for detaching the filter assembly from the dust cup housing is less than a predetermined threshold force which acts on the inner and outer filter as the fixing member is activated.

The fixing member illustrated in FIG. 2*a*) comprises a protruding portion 40 which is arranged on the outer filter and which slides in a receiving portion 41 arranged in said inner filter. In this non-limiting embodiment the filters are formed as molded plastic receptacles. The receiving portion 41 is arranged as a through going slot which is formed in association with the molded first grip 42 to achieve a mechanically stable solution. Further, the portion forming the first grip 42 is protruding inwards from the inner surface of the inner filter receptacle, and here in addition protrudes outwards from the outer surface of the inner filter receptacle which outwardly protruding portion is arranged to slide in a through going slot arranged in the disc forming the edge 50 of the outer filter opening 27. This provides extra stability to the inserting and extracting movement of the inner filter 24, and guides the user to orient the inner filter 24 correctly, with respect to the fixing element, when inserting the inner filter 24 into the outer filter 26. Furthermore, the protruding portion 40 is arranged to retain the inner filter 24 in a displaced position as the inner filter 24 is extracted from the outer filter 25. The protruding portion 40 retains the inner filter when an end of the through going slot 41 bears against the protruding portion 40. As long as the extraction force is less than the threshold force retaining the inner filter 24 in the predetermined position, the inner filter is retained at a position at a predetermined distance d from its mounted position and is thereby visible for a user, while still being in grip with the outer filter 25. The protruding portion 40 is arranged such that it may be released. The protruding portion and/or the slot may be at least partly resilient or shaped in a way that by applying an extraction force larger than the threshold force, the user may detach the inner filter 24. Thereby individual cleansing of the respective filters is possible.

Figure 2B:
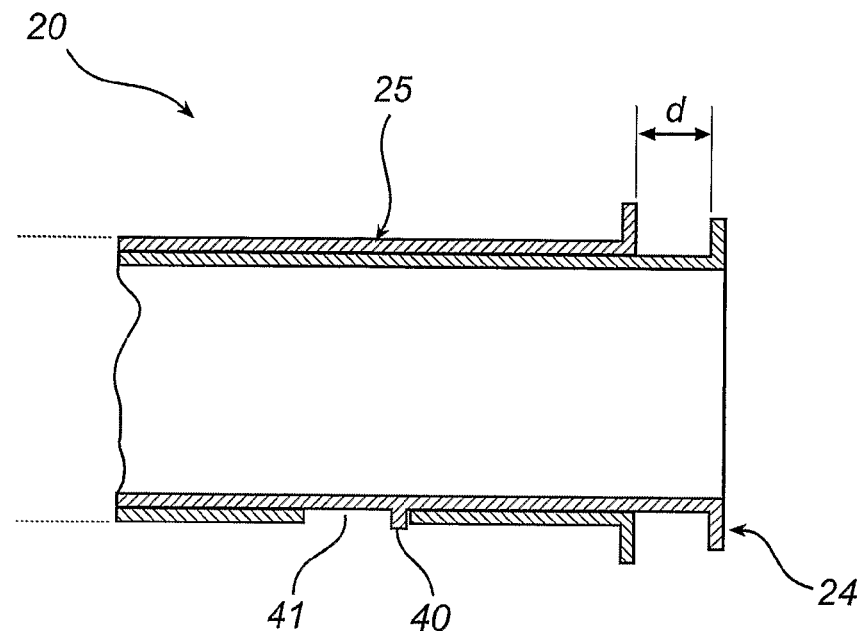

The fixing member illustrated in FIG. 2*b*) comprises a protrusion 40 which is arranged at the inner filter 24 and which slides in a receiving portion 41 arranged in said outer filter 25. The length of the receiving member 41 is corresponding to the displacement d of the inner filter 24.

Figure 2C:
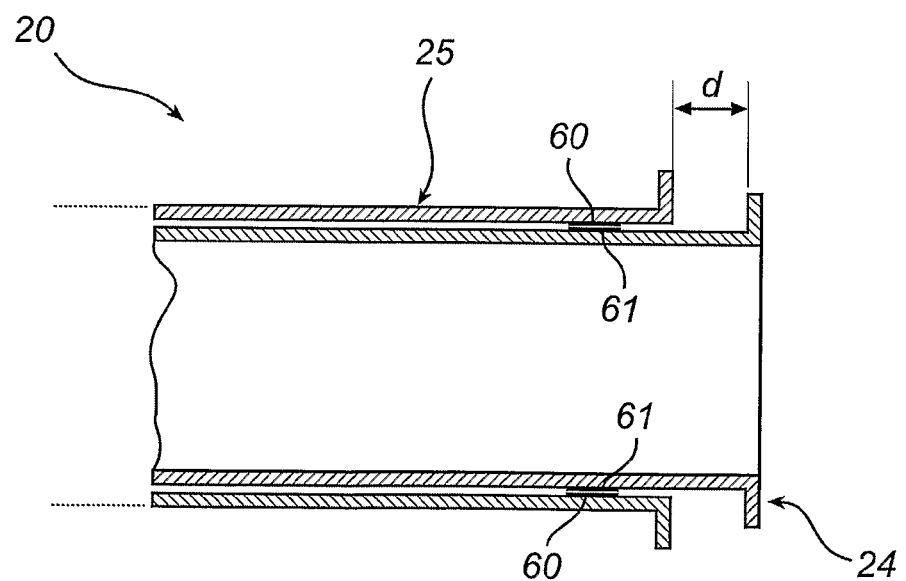

A fixing member in an embodiment of the present invention, as depicted in FIG. 2*c*), is arranged by friction surfaces 50, 51. The friction surfaces may be for instance a second material applied on the filters. The main idea is to provide the inner surface of the outer filter 26 with a sub-surface 50 which when it comes in contact with a subsurface 51 arranged on the outer surface of the inner filter 24 causes a substantial increase in surface friction between the inner filter 24 and the outer filter 26, which retains the inner filter 24 in the current position as long as the extraction force does not exceed a threshold value corresponding to the obtained surface friction. In one embodiment the friction surface 60 is arranged at a distance x from the outer filter opening, and the friction surface 61 is arranged at a distance x+d from the inner filter opening. Then the displacement between the inner filter opening and the outer filter opening when the inner filter is retained is d (not taking the thicknesses of the discs 50 and 51 into account).

It should be noticed that the above described solutions for the fixing member, i.e. having a protrusion and a receiving portion arranged on the inner filter and the outer filter, or having friction surfaces arranged on the inner and outer filter, are intended to be non-limiting examples. As is appreciated by a person skilled in the art a variety of designs are applicable for these inventive solutions and should be regarded as being part of the scope of protection.

The types of filters used in the exemplifying embodiments are merely given as an example. Any suitable type of filter is applicable for the present inventive concept. The filters may for instance have filter elements made of woven material, porous materials etc.

FIG. 3 illustrates a vacuum cleaner apparatus according to an embodiment of the present invention. The vacuum cleaner 30 is an upright vacuum cleaner apparatus. The vacuum cleaner 30 comprises a main body 31 which is longitudinally extended. A suction motor (not shown) is mounted in a motor compartment 34, which is comprised within the main body 31. When operative, the suction motor generates a suction force to draw in a dust laden air-stream via an air inlet which is formed on a bottom end of the main body, and which air inlet is connected to a suction nozzle 33 via a suitable translational air channel (not shown). The suction nozzle 33 has a suction nozzle air inlet formed on a bottom surface (not shown) which is used to suck in a dust laden air-stream when vacuuming a surface. The main body 31 integrally provides and defines a cavity 32 in which the dust cup 10 is arranged. The dust cup air inlet 13 and the suction nozzle air inlet are in fluid communication, such that the dust laden air-stream reaches the dust cup 10, and the dust is separated or filtrated from the air-stream by means of the filter assembly 20. The air-stream continues out via the outlet 14 to the motor compartment before being discharged from the main body via an exhaust aperture.

Even if only the specific type of vacuum cleaner as described above is exemplified herein, it should be noted that the present inventive concept is applicable to other types of vacuum cleaners, e.g. hand held vacuum cleaners, canister type vacuum cleaners, which utilize a filter assembly with an outer filter arranged with an insertable inner filter. Furthermore, the present inventive concept is applicable for other types of devices for separating dust and dirt from a dust-laden air-stream as well. However, for simplicity only vacuum cleaners have been described.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A dust cup comprising: a dust cup housing encompassing a dust cup chamber, said dust cup housing further comprising an air inlet and an air outlet defining a path for a dust laden air-stream to flow through said dust cup chamber, and which air outlet is arranged to be connectable to an air suction element, to which said path is in fluid communication; a filter assembly having a first end which is removably arranged at said air outlet for filtering said dust-laden air-stream; said filter assembly comprising an outer filter and an inner filter, wherein said outer filter and said inner filter are formed as receptacles which are concentrically and unidirectionally arranged with a respective receptacle opening directed towards said first end of the filter assembly, and wherein said inner filter is slidably insertable into said outer filter, and wherein in a mounted position said inner filter is arranged to be substantially fully inserted into said outer filter; characterized in that said filter assembly further comprising a fixing member which is arranged to retain the inner filter in a predetermined displacement position relative to said mounted position, in response to said inner filter being subjected to an extraction force for detaching said filter assembly from said dust cup housing.

2. A dust cup according to claim 1, wherein said fixing member is arranged, such that said inner filter, upon being subjected to an extraction force larger than a predetermined threshold force, is detachable from said outer filter.

3. A dust cup according to claim 2, wherein said filter assembly is detachable from said housing, upon being subjected to an extracting force being smaller than said predetermined threshold force.

4. A dust cup according to claim 1, wherein said fixing member comprises a protruding portion arranged on an outer surface of the receptacle of said inner filter, which protruding portion is further arranged to slide in a receiving portion arranged on an inner surface of the receptacle of said outer filter.

5. A dust cup according to claim 1, wherein said fixing member comprises a protruding portion arranged on an inner surface of the receptacle of said outer filter, which protruding portion is further arranged to slide in a receiving portion arranged on an outer surface of the receptacle of said inner filter.

6. A dust cup according to claim 1, wherein said fixing member comprises friction surfaces arranged on said inner surface of said outer filter and said outer surface of said inner filter.

7. A dust cup according to claim 4, wherein said receiving portion has a length corresponding to said predetermined displacement.

8. A dust cup according to claim 1, wherein said inner filter comprises a first grip element.

9. A dust cup according to claim 1, wherein said outer filter comprises a second grip element.

10. A dust cup according to claim 1, wherein said receptacles have one of a cup shape, conical, and a frusto-conical shape.

11. A vacuum cleaner apparatus comprising a dust cup according to claim 1.

* * * * *

UNITED STATES PATENT AND TRADEMARK OFFICE
CERTIFICATE OF CORRECTION

PATENT NO.         : 8,539,639 B2                                                   Page 1 of 1
APPLICATION NO.    : 13/124254
DATED              : September 24, 2013
INVENTOR(S)        : Engström et al.

It is certified that error appears in the above-identified patent and that said Letters Patent is hereby corrected as shown below:

On the title page Item [30] Foreign Application Priority Data should read

-- Oct. 10, 2008   (SE)        0802181-8 --

Signed and Sealed this
Nineteenth Day of November, 2013

Teresa Stanek Rea
*Deputy Director of the United States Patent and Trademark Office*